United States Patent
Thomas et al.

(10) Patent No.: US 9,694,861 B2
(45) Date of Patent: Jul. 4, 2017

(54) COMPACT TRACK LOADER WITH LOCKABLE SUSPENSION SYSTEM

(71) Applicant: DEERE & COMPANY, Moline, IL (US)

(72) Inventors: Galen C. Thomas, Dubuque, IA (US); Steven R. Whiteman, Dubuque, IA (US); Steve G. Fleischmann, Dubuque, IA (US); Justin C. Gross, Dubuque, IA (US); James Wentzloff, Halladay, UT (US)

(73) Assignee: Deere & Company, Moline, IL (US)

( * ) Notice: Subject to any disclaimer, the term of this patent is extended or adjusted under 35 U.S.C. 154(b) by 107 days.

(21) Appl. No.: 14/877,355

(22) Filed: Oct. 7, 2015

(65) Prior Publication Data

US 2017/0101143 A1    Apr. 13, 2017

(51) Int. Cl.

| | |
|---|---|
| *B60G 17/018* | (2006.01) |
| *B60G 23/00* | (2006.01) |
| *B62C 3/00* | (2006.01) |
| *B62D 55/108* | (2006.01) |
| *E02F 3/34* | (2006.01) |
| *E02F 9/20* | (2006.01) |

(52) U.S. Cl.
CPC ........ *B62D 55/1083* (2013.01); *E02F 3/3414* (2013.01); *E02F 9/2025* (2013.01)

(58) Field of Classification Search
CPC ... B62D 55/1083; E02F 3/3414; E02F 9/2025
USPC .......................................................... 701/37
See application file for complete search history.

(56) References Cited

U.S. PATENT DOCUMENTS

| | | | |
|---|---|---|---|
| 6,247,547 B1 | 6/2001 | Lemke et al. | |
| 7,156,474 B2 | 1/2007 | Safe et al. | |
| 7,231,993 B2 | 6/2007 | Albright et al. | |
| 7,255,184 B2 | 8/2007 | Loegering et al. | |
| 7,404,608 B2 | 7/2008 | Plante et al. | |
| 7,552,785 B2 | 6/2009 | Tuhy | |
| 7,562,727 B1 * | 7/2009 | Hoffart | B62D 55/1125 180/9.1 |
| 7,798,260 B2 | 9/2010 | Albright et al. | |
| 7,862,131 B2 | 1/2011 | Poirier | |
| 8,360,179 B2 | 1/2013 | Daniels et al. | |
| 8,406,955 B2 | 3/2013 | Iwami et al. | |
| 8,573,336 B2 | 11/2013 | Arulraja et al. | |
| 2007/0029871 A1 | 2/2007 | Wake et al. | |

(Continued)

*Primary Examiner* — Isaac Smith
(74) *Attorney, Agent, or Firm* — Taft Stettinius & Hollister LLP; Stephen F. Rost

(57) ABSTRACT

A suspension assembly of a work machine being movable in a forward direction. The work machine includes a frame, an undercarriage supporting the frame and at least one ground-engaging track. The suspension assembly includes a torsion assembly having an axle, a torsion bar adapted to be fixedly coupled to the frame, and an axle arm coupled at one end to the axle and at an opposite end thereof to the torsion bar. A locking arm has a first end and a second end, where the first end is coupled to the axle arm. A hydraulic actuator is coupled to the second end of the locking arm. The hydraulic actuator is operably controlled between a locked configuration and an unlocked configuration. In the unlocked configuration, the axle arm is pivotable relative to the frame, and in the locked configuration the axle arm is restricted from pivoting relative to the frame.

20 Claims, 8 Drawing Sheets

(56) References Cited

U.S. PATENT DOCUMENTS

2009/0321152 A1* 12/2009 Arulraja .............. B62D 55/108
                                              180/9.62
2010/0060075 A1   3/2010 Hansen
2013/0087957 A1   4/2013 Riedl et al.
2013/0161927 A1   6/2013 Riedl et al.

* cited by examiner

COMPACT TRACK LOADER WITH LOCKABLE SUSPENSION SYSTEM

FIELD OF THE DISCLOSURE

The present disclosure relates to a suspension system, and in particular, to a suspension system of a work machine that can be locked or unlocked based on application.

BACKGROUND OF THE DISCLOSURE

Compact track loaders or other work machines often have at least one implement that is controlled by an operator. The implement can be a plurality of different devices such as a backhoe or a bucket to name a few. It is often desired to have a rigid connection with an underlying surface if the implement is going to maneuver a payload. More specifically, to provide the best possible control of the implement, the work machine should not substantially move when the implement is manipulating the payload. If the work machine utilizes tracks to travel along the underlying surface, sometimes the tracks are rigidly mounted to a frame of the work machine to inhibit movement of the work machine when the implement is being used. Similarly, work machines often have wheels rigidly mounted to the frame. The wheels, however, may slightly deflect as the work machine manipulates the payload. The deflection of the wheels may cause the work machine to change pitch and accordingly the implement is difficult to control.

When the tracks or wheels are rigidly mounted to the work machine, the operator may experience various inputs from the underlying surface as it travels thereon. The inputs may be uncomfortable for the operator and make it difficult for the operator to control the work machine. To counter these inputs, some work machines have tracks or wheels that implement a suspension system. The suspension system reduces the impact of the inputs from the underlying surface and provides a more comfortable ride for the operator. However, the suspension system also deflects when the operator utilizes the implement to move the payload, causing the work machine to pitch relative to the underlying surface.

Accordingly, work machines with a suspension system allow the operator to comfortably traverse the underlying surface but cause the operator to lose precision when manipulating the implement. Alternatively, work machines that do not have a suspension allow the operator to manipulate the implement with high precision but provide an uncomfortable ride for the operator when the work machine traverses the underlying surface.

SUMMARY

A locking axle assembly may couple at least one drive mechanism to a frame of a work machine. The locking axle assembly may have an axle adapted to be pivotally coupled to the at least one drive mechanism and an axle arm having an axle through-hole and a locking coupler through-hole offset from one another. The axle may be mechanically coupled to the axle arm at the axle arm through-hole. Further, a locking coupler arm may be pivotally coupled to the frame and mechanically coupled to the axle arm at the locking coupler through-hole. The locking coupler may also define a locking aim. Additionally, a locking actuator may have a locked configuration and a dampen configuration and a first end and a second end. The first end may be pivotally coupled to the frame and the second end may be pivotally coupled to the locking arm. In one embodiment, when the locking actuator is in the dampen configuration, the axle arm can partially pivot about the locking coupler arm. Further, when the locking actuator is in the lock configuration the axle arm may be restricted from pivoting about the locking coupler arm.

In another embodiment, a locking suspension system for a tracked vehicle may have a frame coupling a cab to at least one track assembly. The track assembly may further have a front end and a rear end. A front axle coupler may define a front axis in the track assembly and a rear axle coupler may define a rear axis in the track assembly. A front torsion axis may be parallel to, but offset from, the front axis and defined by the frame and a rear torsion axis may be parallel to, but offset from, the rear axis and defined in the frame. Further, a front axle arm may extend between the front axis and the front torsion axis and a rear axle arm may extend between the rear axis and the rear torsion axis. A locking coupler arm may be pivotally coupled to the frame along the front torsion axis and have a locking arm extending therefrom. A locking actuator may be pivotally coupled to the frame on a first end and pivotally coupled to the locking arm on a second end. Further, a front torsion spring and a rear torsion spring may be pivotally coupled to frame at each the front torsion axis and the rear torsion axis respectively. The front torsion spring may be mechanically coupled to the locking coupler arm and the locking coupler arm may be mechanically coupled to the front axle coupler. Finally, the rear torsion spring may be mechanically coupled to the rear axle arm.

In yet another embodiment, a method for selectively providing a dampened suspension for a work machine may include providing a controller, a frame, a track assembly having a front axle mount and a rear axle mount, a front axle coupled to a front axle arm having a front axle arm through-hole, a rear axle coupled to a rear axle arm having a rear axle arm through-hole, a locking coupler having a locking arm, a front spring, a rear spring, and a actuator. The method includes positioning the front axle within the front axle mount and pivotally coupling the front axle thereto, positioning the rear axle within the rear axle mount and pivotally coupling the rear axle thereto, mechanically coupling the front axle arm to the locking coupler will through the front axle arm through-hole and pivotally coupling the locking coupler aim to the frame, mechanically coupling the front spring to the locking coupler arm, pivotally coupling the locking actuator to the frame on a first end and to the locking arm on a second end, pivotally coupling the rear axle arm to the frame and further mechanically coupling the spring to the rear axle arm, and programming the controller to transition the locking actuator between a lock configuration, where the front axle arm is substantially restricted from pivoting, and a dampen configuration, where the front axle arm can pivot.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 5a is a cross-sectional view of a torsion spring from FIG. 5;

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
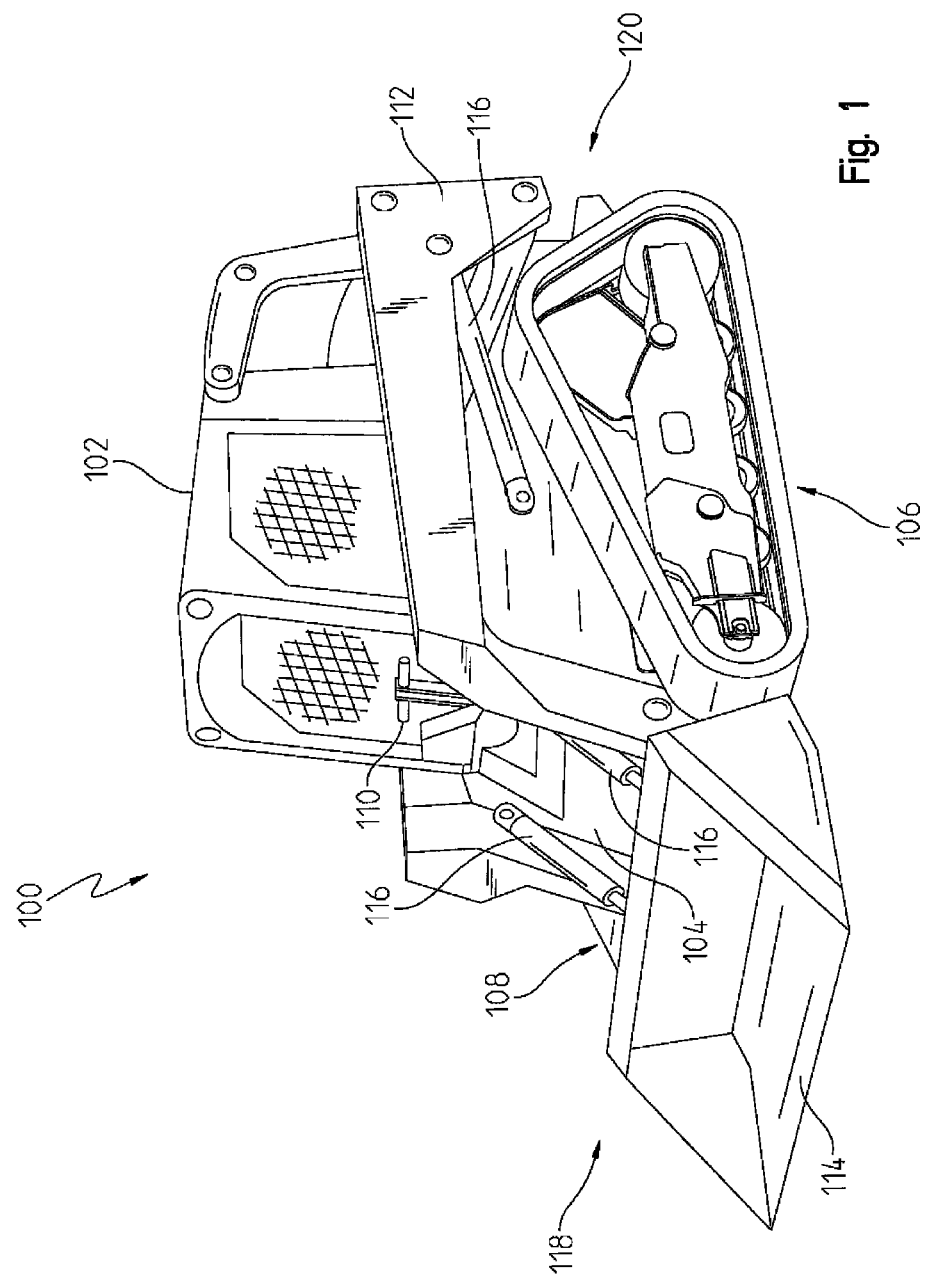
FIG. 1 is an elevated perspective view of a work machine.

Referring now to FIG. 1, a compact track loader or work machine 100 is shown. The work machine 100 may have a front portion 118, a rear portion 120, and a cab 102 coupled to a frame 104. Also coupled to the frame 104 may be a first track assembly 106 and a second track assembly 108. An operator may be positioned in the cab 102 and have access to a plurality of controls 110. The plurality of controls may include joysticks, levers, wheels, push buttons, switches, knobs, dials, and any other known control mechanism for controlling a function of the machine 100. Further, the first and second track assembly 106, 108 may be selectively powered by a power source (not shown) based on the operator's input to the controls 110.

The work machine 100 may also have a boom arm 112 pivotally coupled to the frame 104 at one end and to an implement (e.g., a bucket 114) at an opposite end. The boom arm 112 and the implement or bucket 114 may further be coupled to the frame 104 through one or more actuators 116 that allow the operator to control the positioning of the bucket 114 via the controls 110. The actuator can be controlled mechanically, hydraulically, pneumatically, electrically or by any other means known to the skilled artisan.

While the work machine 100 is shown and described as a compact track loader, this disclosure is not limited in application to compact track loaders. More specifically, any work machine that utilizes an implement may benefit from the teachings of this disclosure. As such, this disclosure also applies to work machines that use wheels instead of tracks. This disclosure is also applicable to any size of work machine and the compact track loader is only referenced herein as one example of a type of work machine. Accordingly, a backhoe, motor grader, tank, dump truck, excavator, crawler or any other similar work machine is considered herein.

Figure 2:
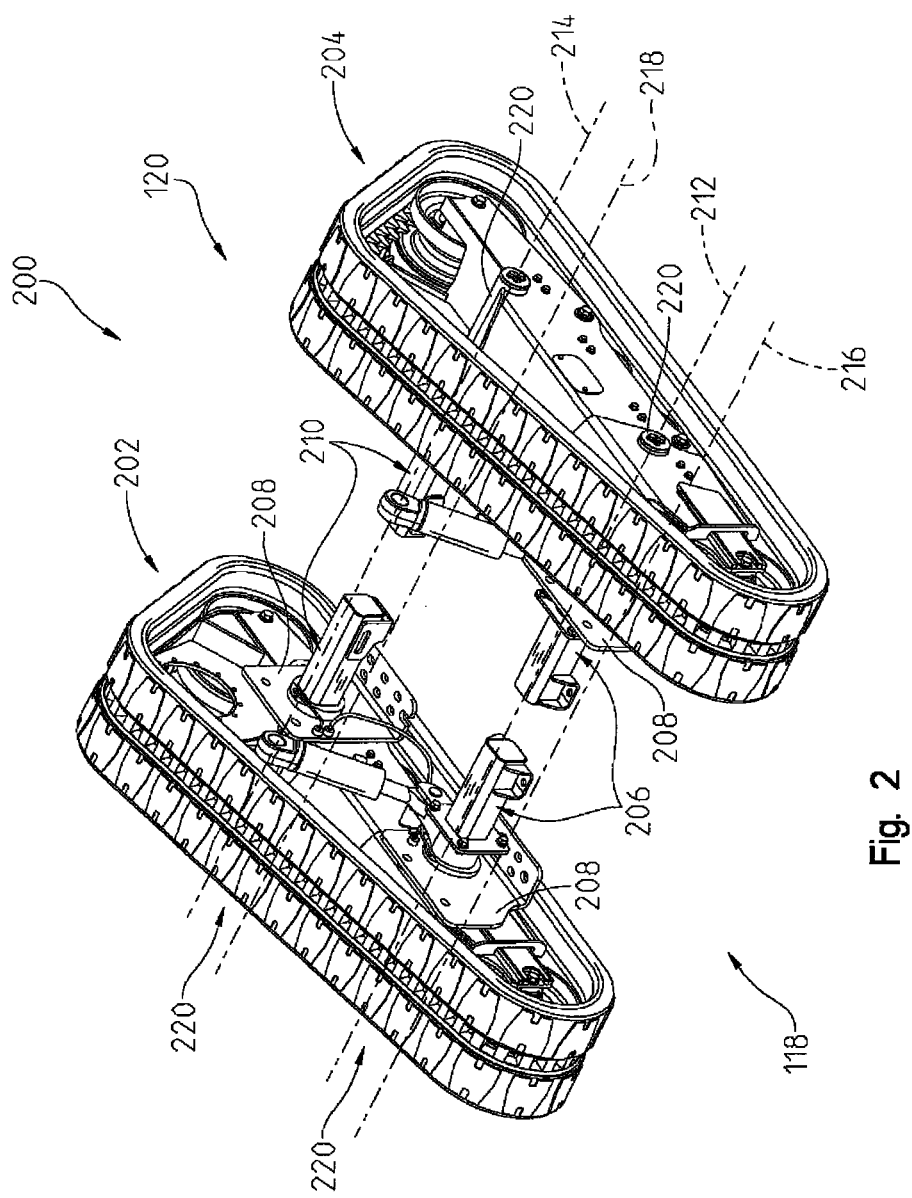
FIG. 2 is an elevated perspective view of a pair of track assemblies isolated from the work machine of FIG. 1.

Referring now to FIG. 2, a pair of track assemblies 200 are shown with the cab 102 and the frame 104 removed. The pair of track assemblies 200 may be a first track assembly 202 and a second track assembly 204. A front torsion suspension assembly 206 may be coupled to the frame 104 (not shown in FIG. 2) through a frame coupler 208. Similar to the front portion 118 the rear portion 120 may have a rear torsion suspension assembly 210. As shown in FIG. 2, each of the first track assembly 202 and the second track assembly 204 are coupled to the frame 104 at both the front portion 118 and the rear portion 120. That is to say, each track assembly 202, 204 includes two separate torsional suspension assemblies 206, 210 to couple the respective track assembly 202, 204 to the frame 104.

A front axle axis 212 and a rear axle axis 214 are also shown in FIG. 2. The front and rear axle axis 212, 214 may be aligned with axle couplers 220 defined in the first and second track assembly 202, 204. The axle couplers 220 may provide a coupling location for the front and rear torsional suspension assemblies 206, 210 to be pivotally coupled to the first and second track assemblies 202, 204.

Also shown in FIG. 2 are a front torsion axis 216 and a rear torsion axis 218. The front torsion axis 216 may be aligned with the front torsion suspension assembly 206 and the rear torsion axis 218 may be aligned with the rear torsional suspension assembly 210. The front torsion axis 216 may be offset from, but parallel to, the front axle axis 212 and the rear torsion axis 218 may be offset from, but parallel to, the rear axle axis 214.

While the front and rear axle axis 212, 214 have been described as the same for the first track assembly 202 and the second track assembly 204, the front and rear axle axis 212, 214 may not always be aligned between the first and second track assembly 202, 204. For example, the first track assembly 202 may become compressed while the second track assembly 204 is uncompressed. In this configuration, the front and rear axle axis 212, 214 of the first track assembly 202 may be offset from the front and rear axle axis 212, 214 of the second track assembly 204.

Figure 3:
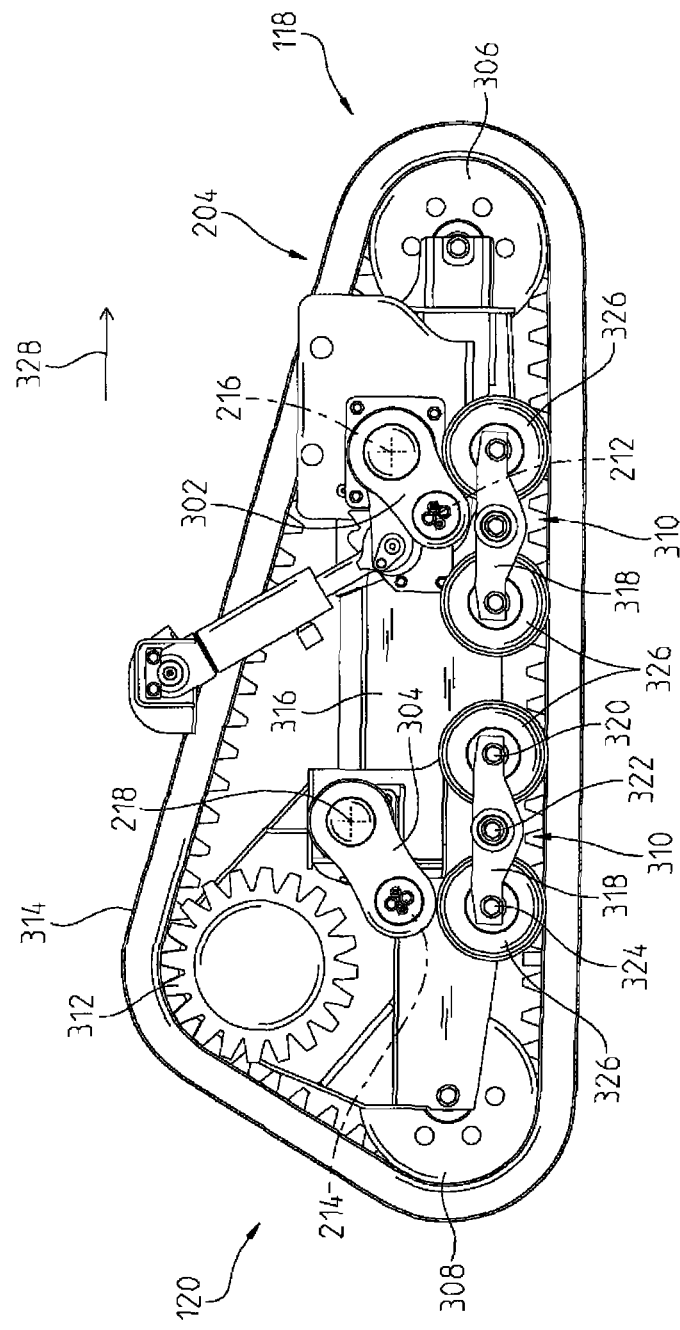
FIG. 3 is a side view of one of the track assemblies from FIG. 2.

Now referring to FIG. 3, a side view of the second track assembly 204 is shown. While the side view of the second track assembly 204 is shown and described below, the description of the embodiments below are equally applicable for the first track assembly 202 as well. In other words, the description and illustrated embodiments of the second track assembly 204 are also applicable to the first track assembly 202.

In the side view of FIG. 3, the offset between the front axle axis 212 and the front torsion axis 216 and the offset between the rear axle axis 214 and the rear torsion axis 218 are more clearly shown. Also more clearly shown in FIG. 3 is a front axle arm 302 and a rear axle arm 304. The front axle arm 302 may extend from the front axle axis 212 to the front torsion axis 216. Similarly, the rear axle arm 304 may extend from the rear axle axis 214 to the rear torsion axis 218. In one nonexclusive embodiment, the front and rear axle arm 302, 304 may extend downward from the frame at an angle between about 180 and 270 degrees relative to a forward direction as shown by arrow 328. For purposes of this disclosure, it is presumed a work machine is capable of moving along a ground surface in at least a forward direction (e.g., in the direction of arrow 328) and a reverse direction (e.g., in a direction opposite of arrow 328).

The second track assembly 204 may have a front idler wheel 306, a rear idler sprocket 308, two bogie roller assemblies 310 and a drive sprocket 312 pivotally coupled to an undercarriage frame 316. The drive sprocket 312 may be coupled to the undercarriage frame 316 through a drive motor (not specifically shown) to provide torque to the drive sprocket 312 that in turn rotates a drive track 314 that encompasses or substantially surrounds the second track assembly 204. The drive track may provide at least one ground-engaging interface between the work machine 100 and the underlying ground surface. Further, the rear idler sprocket 308, a bogie roller suspension assembly 310, and the front idler wheel 306 may provide support for the drive track 314 as the work machine 100 travels along the underlying surface.

In the illustrated embodiment of FIG. 3, the work machine is shown having a pair of bogie roller suspension assemblies 310. The bogie roller assemblies 310 may each have a yoke 318 pivotally coupled to the undercarriage frame 316 of the machine. In this embodiment, each yoke 318 may define a front axis 320, a middle axis 322, and a rear axis 324. The yoke 318 may be pivotally coupled to the undercarriage frame 316 along the middle axis 322 and further have two bogie rollers 326, one of which is pivotally coupled to the yoke 318 at of the front axis 320 and the other at the rear axis 324.

The bogie roller suspension assembly 310 may reduce the force inputs felt by the operator in the cab 102 of the work machine 100 as is known in the art. In particular, the bogie roller suspension assemblies 310 may absorb low magnitude, high frequency vibrational inputs. In other embodiments, any number of bogie roller suspension assemblies may be positioned between the rear idler sprocket 308 and the front idler wheel 306. Accordingly, this disclosure is not limited to any particular number of bogie roller suspension assemblies.

While the embodiment shown in FIG. 3 includes a pair of bogie roller suspension assemblies 310, this disclosure is not limited to using a bogie roller suspension assembly 310. In other words, the work machine 100 of FIG. 1 may not have a bogie roller assembly 310 at all. Rather, the work machine 100 may have roller wheels pivotally mounted directly to the undercarriage frame 316. In this example, force inputs may be transferred more directly to the cab 102 compared to the aforementioned embodiment with the bogie roller suspension assembly 310. In yet another embodiment, the work machine 100 may have a combination of bogie roller assemblies and fixed rollers. Accordingly, this disclosure is not limited to any particular configuration of rollers and any combination of fixed and/or bogie rollers are considered herein.

Figure 4:
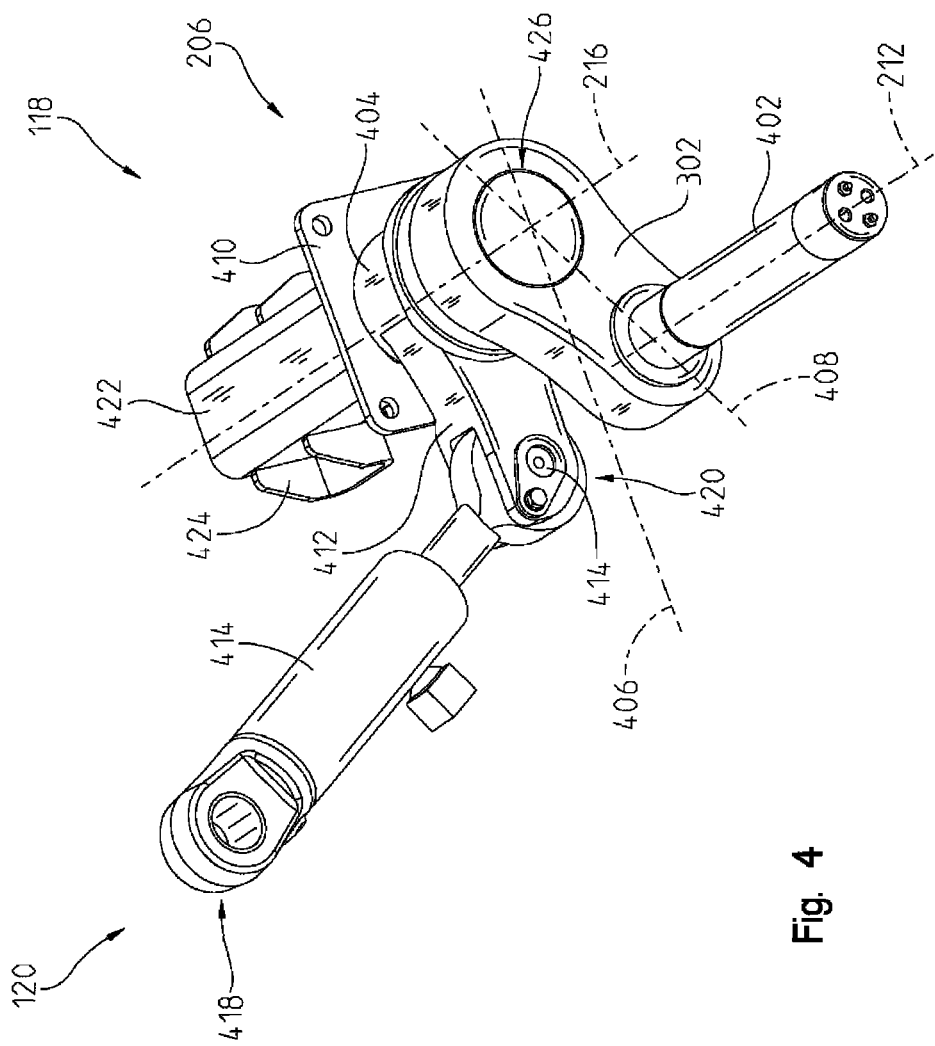
FIG. 4 is an elevated perspective view of a front torsion suspension isolated from the work machine of FIG. 1.

Now referring to FIG. 4, an isolated view of the front torsion suspension assembly 206 is shown. More specifically, the front axle arm 302 may have an axle through-hole that may be mechanically coupled to a pin or axle 402 at the front axle axis 212. The front axle arm 302 may also have a locking coupler through-hole 426 and be mechanically coupled to a locking coupler arm 404 at the front torsion axis 216. In other words, the front axle arm 302 may provide a linkage between the locking coupler arm 404 along the front torsion axis 216 and the axle 402 along the front axle axis 212.

Figure 5:
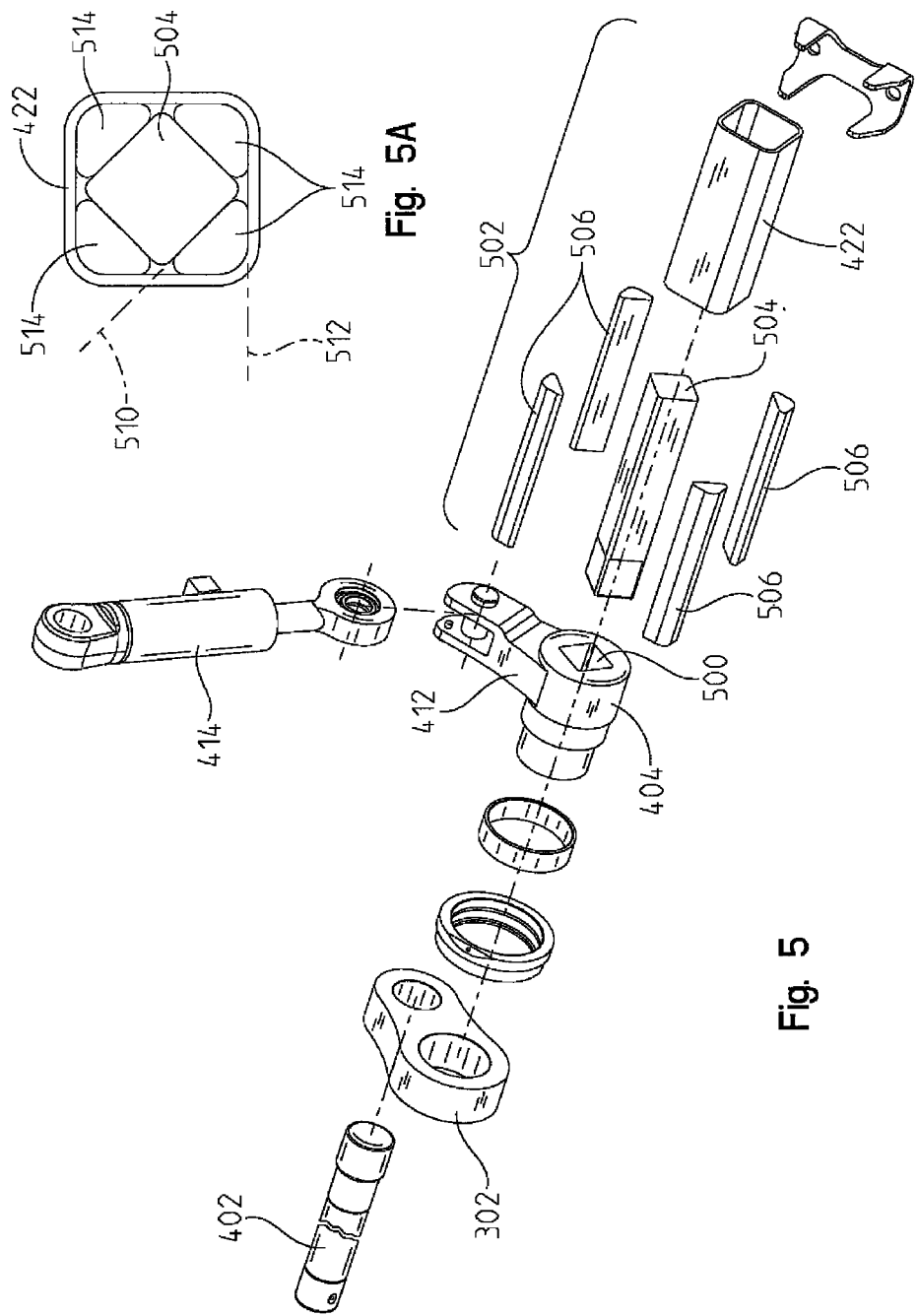
FIG. 5 is an exploded view of the front torsion suspension of FIG. 4.

In one embodiment, the locking coupler arm 404 may be pivotally coupled to the frame 104 along the front torsion axis 216. The locking coupler arm 404 may also include both a locking arm 412 and a recessed spindle coupler 500 (FIG. 5). The locking arm 412 may be a portion of the locking coupler arm 404 that extends radially away from the front torsion axis 216. In one embodiment, a locking actuator 414 may be pivotally coupled to both the frame 104 (not shown in FIG. 4) and the locking arm 412. More specifically, the locking actuator 414 may have a first end 418 that may be pivotally coupled to the frame 104 and a second end 420 pivotally coupled to the locking arm 412. The distance between the first end 418 and the second end 420 of the locking actuator 414 may be variable. More specifically, the locking actuator 414 may change the distance between the first end 418 and the second end to partially control the angular orientation of the locking coupler arm 404 about the front torsion axis 216. By controlling the angular orientation of the locking coupler arm 404, the angular orientation of the front axle arm 302 is also controlled.

A tubular member 422 is also shown in FIG. 4. The tubular member 422 may be mechanically coupled to the frame 104 along the front torsion axis 216 to provide an outer frame for a torsional spring 502 (FIG. 5) as described in more detail in FIG. 5. In one embodiment, the tubular member 422 may be further coupled to the frame 104 via one or more brackets 424. Each bracket 424 may provide additional support to mechanically couple the tubular member 422 to the frame 104. In yet another embodiment, the tubular member 422 may also be mechanically coupled to one or more frame coupler plate 410 that may be mechanically coupled to the frame 104 through one or more fasteners.

Also shown in FIG. 4 is a horizontal axis 406. The horizontal axis 406 corresponds with the forward direction of travel of the work machine, as described above and shown in FIG. 3. One aspect of the present disclosure is the particular angular orientation of the front axle arm 302. More specifically, the front axle arm 302 may define an arm axis 408. The arm axis 408 may be perpendicular to, and pass through, both the front torsion axis 216 and the front axle axis 212. In one aspect of the present embodiment, an angular orientation $\Theta$ between the arm axis 408 and the horizontal axis 406 may define certain kinematic properties of the front and rear torsion suspension assemblies 206, 210. As shown in FIG. 3, the front and rear axle arms form a four-bar linkage that can be characterized kinematically for controlling or reducing pitch. This will be addressed in further detail below. The front axle arm 302 may be pivotally coupled to the frame 104 through frame coupler plate 410 and the angular orientation of the frame coupler plate 410 may be controlled by the locking actuator 414 as described above.

The above embodiment refers to the front axle arm 302, the front axle axis 212, the front torsion axis 216, and other components that have been described for the front torsion suspension assembly 206, however, these teachings are equally applicable to the rear torsion suspension assembly 210. Accordingly, the description above for components of the front torsion assembly 206 are also hereby incorporated as describing one embodiment of the rear torsion assembly 210 as well.

In one embodiment, the locking actuator 414 may be a pneumatic, hydraulic, or electric system and allow a controller 802 (FIG. 8) to control the angle $\Theta$ of the front axle arm 302. More specifically, if the controller 802 sends a signal to the pneumatic, hydraulic, or electric system of the locking actuator 414 to change the distance between the first end 418 and the second end 420, the locking coupler arm 404 can rotate about the front torsion axis 216 thereby causing the front axle arm 302 to change the angle $\Theta$ relative to the horizontal axis 406.

In another embodiment, the locking actuator 414 may not alter the angle $\Theta$. Rather, the locking actuator 414 may have a suspension or unlocked configuration where the locking actuator 414 reduces torsional inputs applied to the locking coupler arm 404. For purposes of this disclosure, this configuration may be referred to as a suspension mode where the torsional suspension assembly is active and thereby is able to absorb high magnitude, low frequency vibrational inputs. More specifically, when the axle 402 is coupled to a track assembly 202, 204, the track assembly 202, 204 may transfer force inputs to the axle 402. In response to the force inputs, the front axle arm 302 may experience a torsional force about the front torsion axis 216. The torsional force may cause the angle Θ to decrease as the front axle arm 302 rotates about the torsion axis. Accordingly, the locking coupler arm 404 will also pivot about the front torsion axis 216. As the locking coupler arm 404 pivots, the locking arm 412 may force the second end 420 of the locking actuator 414 towards the first end 418. In this embodiment, the locking actuator 414 may displace fluid as a response to the change in distance between the first end 418 and the second end 416. Further, the rate of fluid displacement may be controlled for damping the force input transferred from the tack assembly 202, 204 to the frame 104 and the cab 102.

Figure 8:
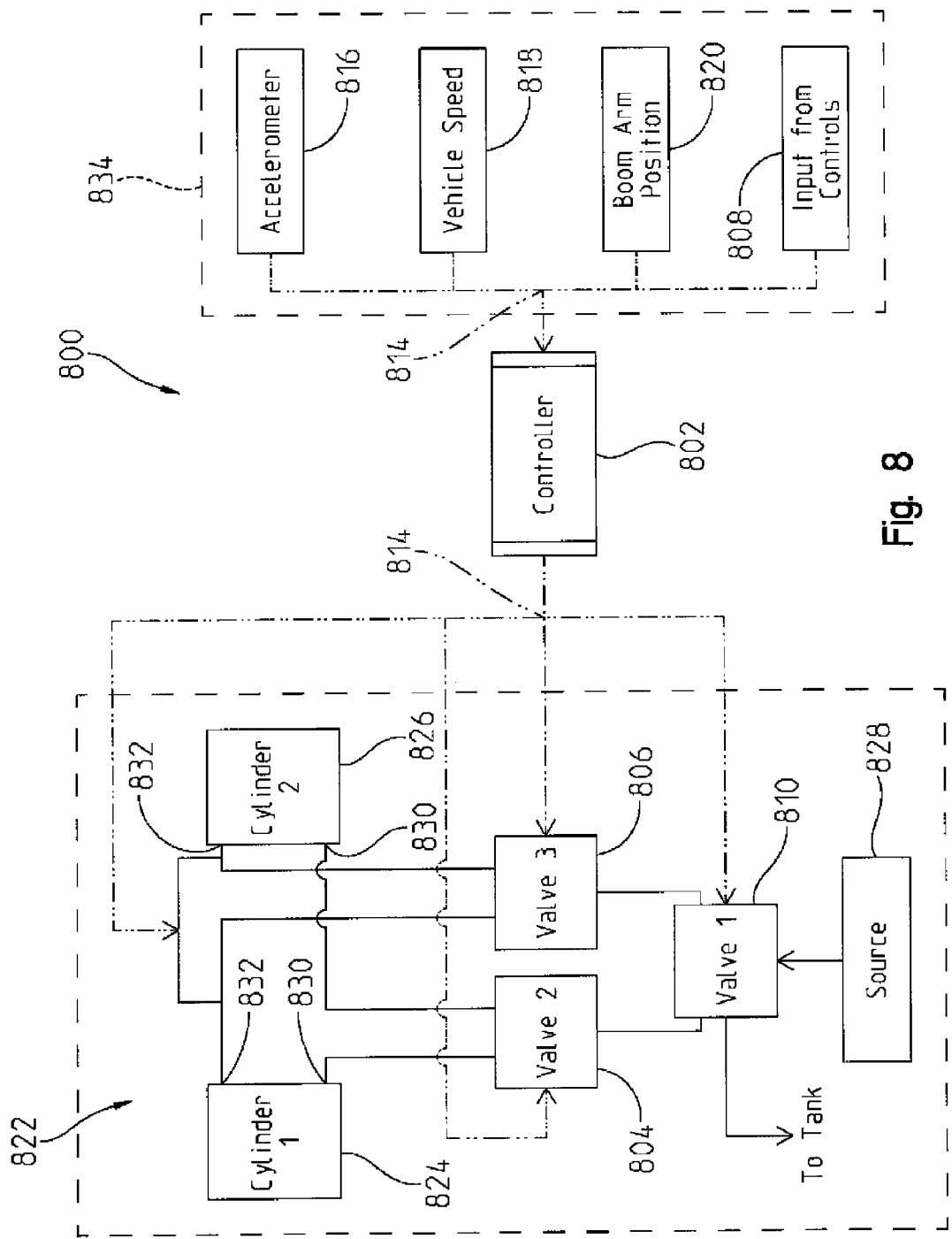
FIG. 8 is a controls schematic of a work machine for controlling a lockable suspension system.

In one embodiment, the damping characteristics of the locking actuator 414 may be altered by an adjustable orifice valve or the like (i.e. a second valve 804 and/or a first valve 806 as shown in FIG. 8). More specifically, the rate of fluid displacement of the locking actuator 414 may be altered by the adjustable orifice valve thereby creating variable damping. In one embodiment, the adjustable orifice valve may be controlled by the controller 802 to adjust the damping based on an operator input 808 (FIG. 8) from the controls 110. In yet another embodiment, the controller 802 may adjust the adjustable orifice valve automatically based on inputs from one or more accelerometers 816.

In addition to coupling to the locking actuator 414 to control the torque along the front torsion axis 216, the locking coupler arm 404 may also be coupled to a torsion spring 502 as shown by the exploded view of the front torsion suspension assembly 206 in FIG. 5. The torsion spring 502 may have a torsion bar or spindle 504 sized to be longitudinally aligned with, and positioned within the tube 422. Further, a plurality of cords 506 may be positioned between the spindle 504 and the tube 422. In one embodiment, the spindle 504 may have a spindle bottom axis 510 and a first square cross section that is smaller than a second square cross-section of the tube 422. The tube 422 may define a tube bottom axis 512 and the spindle bottom axis 510 may be about 45 degrees offset from the tube bottom axis 512 when the spindle 504 is positioned within the tube 422. Further, corner channels 514 may be defined between the spindle 504 and the tube 422 and the cords 506 may be positioned therein to substantially maintain the radial position of the spindle 504 within the tube 422.

In one embodiment, the cords 506 may be composed of an elastomer or other material having similar elastic properties. The cords 506 may inhibit rotation of the spindle 504 relative to the tube 422. More specifically, if torque is applied to the spindle 504 and the tube 422 is fixed to the frame 104, the spindle 504 may begin to rotate relative to the tube 422, thereby compressing the cords 506. Once the cords 506 are compressed sufficiently to fully transfer the torque applied to the spindle 504, the torque input is resisted and transferred into the frame 104.

In one embodiment, the spindle 504 may be mechanically coupled to the locking coupler arm 404 via the recessed spindle coupler. In this embodiment, any torque applied to the locking coupler arm 404 along the front torsion axis 216 may be resisted by the torsion spring 502 as described above.

Figure 6:
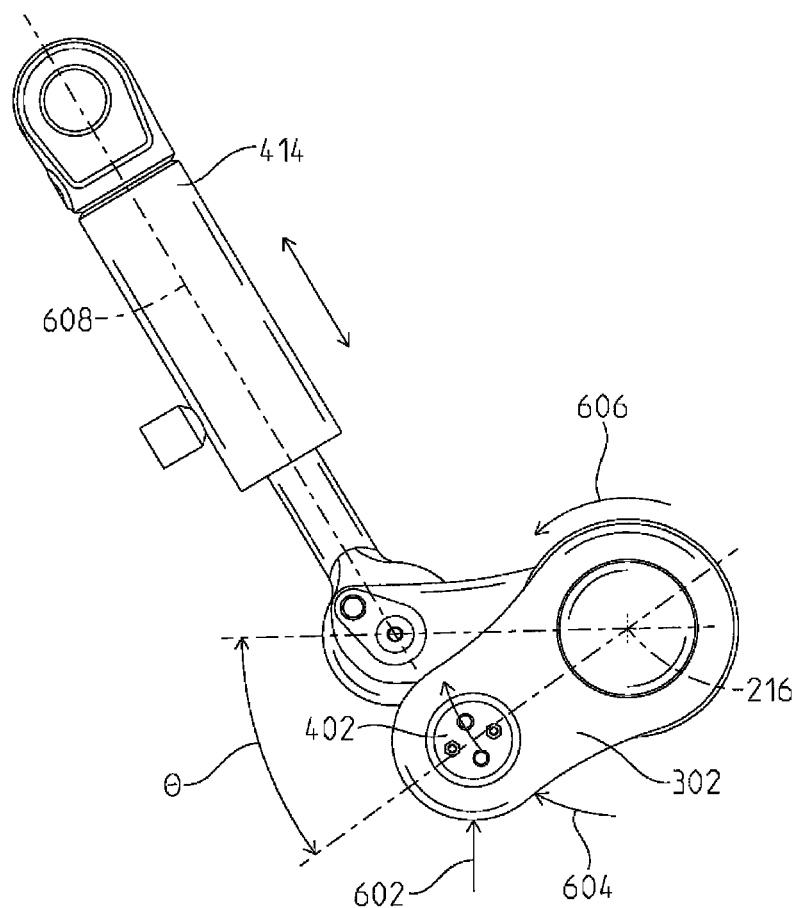
FIG. 6 is a side view of several components of the front torsion suspension of FIG. 4 showing directions of force.

Referring to FIG. 6, a side view of a portion of the torsion suspension assembly is shown with various forces acting thereon during operation. In particular, an applied force 602 is shown acting on the axle 402. The applied force 602 may be illustrative of a force that is applied to the axle 402 by the track assembly 202, 204 when the track assembly 202, 204 travels over an obstacle. Responsive to the applied force 602, the front axle arm 302 may pivot about the front torsion axis 216 to generate an axle arm torsional force 604 about the front torsion axis 216. The torsional force 604 may be transferred to the locking coupler arm 404 because the locking coupler arm 404 is mechanically coupled to the front axle arm 302. However, responsive to the torsional force 604, the torsion spring 502 may provide a resistive torsional force 606 to the locking coupler arm 404 because the spindle 504 is mechanically coupled to the locking coupler arm 404 as described above.

In one embodiment, the greater the axle arm torsional force 604 generated by the applied force 602, the more the front axle arm 302 rotates to generate a smaller angle Θ. Further, the smaller the angle Θ, the more the cords 506 within the torsion spring 502 are compressed and thus the greater the resistive torsional force 606. The angle Θ may become increasingly small until the resistive torsional force 606 is equal to or greater than the axle arm torsional force 604. In other words, the applied force 602 can rotate the front axle arm 302 until the resistive torsional force 606 equals the axle arm torsional force 604.

The torsional force 604 may also be countered in part by the locking actuator 414. As described above, the locking actuator 414 can manipulate the distance between the first end 418 and the second end 420. As the angle Θ changes, the length of the locking actuator 414 also changes. Accordingly, controlling the length of the locking actuator 414 or damping any change in length of the locking actuator 414 can control the reaction of the front torsion suspension assembly 206 to the applied force 602.

In one embodiment, the locking actuator 414 is a hydraulic actuator and the adjustable orifice valve controls the damping rate of the locking actuator 414. In this embodiment, different damping rates are achieved by adjusting the orifice valve to different positions. Accordingly, the front axle arm 302 may only be able to change the angle Θ at a rate consistent with the damping rate of the locking actuator 414. In one embodiment, the controller 802 adjusts the damping rate.

The locking actuator 414 may also lock the front axle arm 302 at any angle Θ in a locked or rigid configuration. In this disclosure, the locked configuration may be referred to as a rigid mode where the torsional suspension assembly is locked and unable to reduce vibrational inputs. This mode may be desirable when the machine is performing various applications such as stockpiling, truck loading, digging, grading, etc. More specifically, the locking actuator 414 may be a hydraulic actuator with a first valve 810 (FIG. 8) being hydraulically coupled and for controlling the flow of hydraulic fluid thereto. The first valve 810 may have an open position that allows hydraulic fluid to flow therethrough. In the open position, the locking actuator 414 may change lengths and/or have a damping rate as described above. The first valve 810 may also have a closed position. When the first valve 810 is in the closed position, hydraulic fluid may not flow therethrough and the locking actuator 414 may be substantially restricted from changing axial lengths. In the locked configuration, the locking actuator 414 restricts the locking coupler arm 404, and therefore the front axle arm 302, from rotating about the front torsion axis 216. In one embodiment, the first valve 810 may be moved between the open position and the close position by the controller 802.

A coil spring (not shown) may be used instead of the torsion spring 502 described above to provide the resistive torsional force 606. In this embodiment, the coil spring encompasses the locking actuator 414 and may be coupled between the first end 418 and the second end 420. The coil spring may provide a biasing force in a direction separating the first end 418 and the second end 420 from one another. In this embodiment, the resistive force 606 is generated by the coil spring and the locking actuator 414 can provide damping and locking as described above.

In one embodiment, the rear torsion suspension assembly 210 may function substantially the same way as described above for the front torsion suspension assembly 206. In another embodiment, the rear torsion suspension assembly 210 may not have the locking coupler arm 404 or the locking actuator 414. In this embodiment, the front axle arm 302 may be pivotally coupled to the frame 104 along the rear torsion axis 218 and fixedly coupled to the spindle 504. The rear torsion suspension assembly 210 may not be able to reduce or lock the movement of the front axle arm 302 but rather provides the resistive force 606 through the torsion spring 502.

Figure 7:
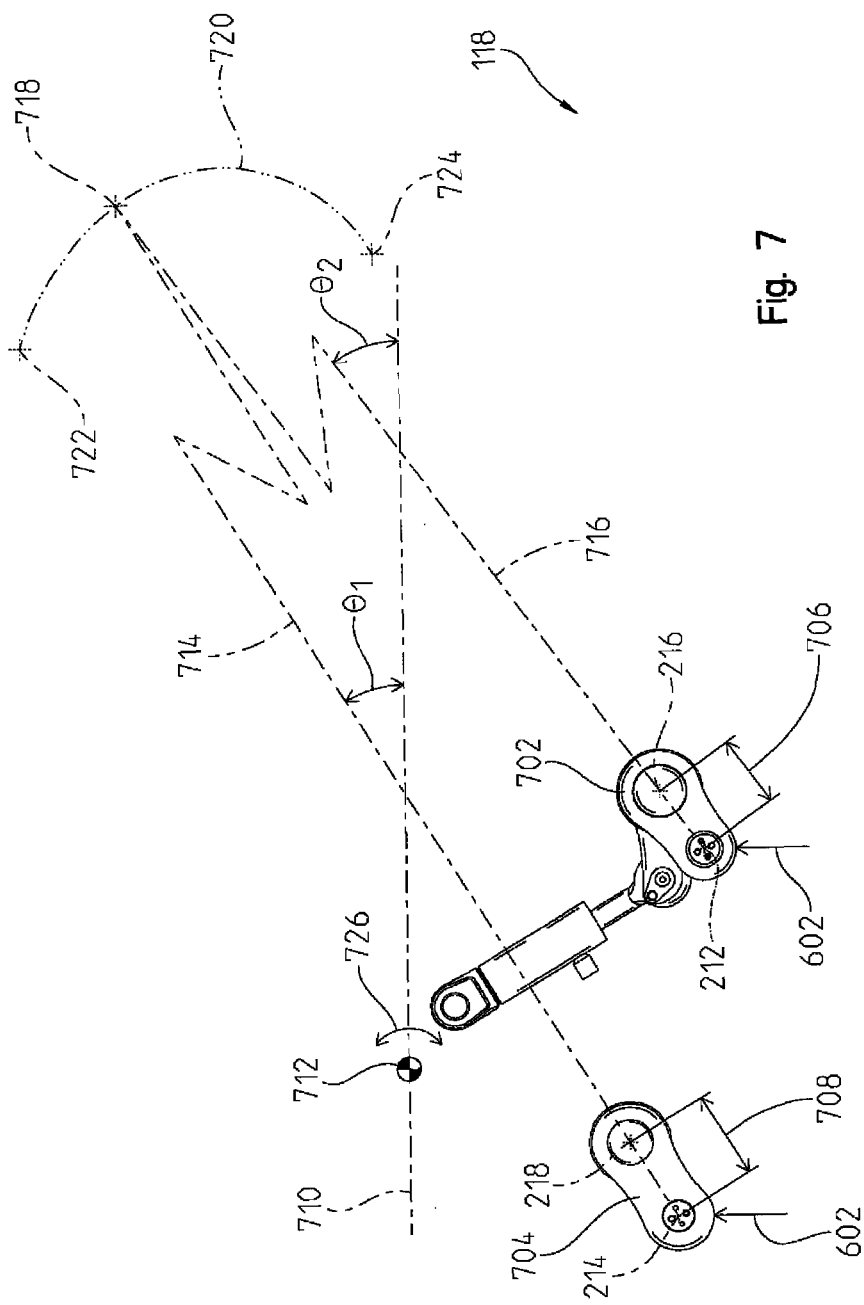
FIG. 7 is a side view of one embodiment of a torsion suspension system.

A front axle arm 702 and a rear axle arm 704 are shown isolated from the work machine 100 in FIG. 7. Also shown in FIG. 7 is a front axle arm distance 706 extending from the front torsion axis 216 to the front axle axis 212. Similarly, a rear axle arm distance 708 extends from the rear torsion axis 218 to the rear axle axis 214. In one aspect of this embodiment, the rear axle arm distance 708 may be greater than the front axle arm distance 706. Additionally the front axle arm 702 may be pivotally mounted to the undercarriage frame 316 (not shown in FIG. 7) at the front axle axis 212 and the rear axle arm 704 may be pivotally mounted to the undercarriage frame 316 at the rear axle axis 214. That is to say, the front axle axis 212 and the rear axle axis 214 may be a fixed distance from one another. Similarly, the front and rear axle arms 702, 704 may be pivotally coupled to the frame 104 (not shown in FIG. 7) at the front and rear torsion axis 216, 218 respectively, thereby fixing the distance between the front and rear torsion axis 216, 218.

In the above described embodiment, when the front axle arm 702 pivots about the front axle axis 212, the rear axle arm 704 may also be forced to pivot about the rear axle axis 214. Both axle arms 702, 704 may pivot simultaneously because of the fixed pivotal coupling points of the front and rear axle arms 702, 704. However, because the front axle arm distance 706 is less than the rear axle arm distance 708, each axle arm 702, 704 may rotate to a different degree relative to the respective front or rear torsion axis 216, 218.

To further illustrate the above embodiment, a horizontal axis 710 is defined along which the machine can travel in the forward direction 328. The horizontal axis 710 may be disposed longitudinally along the work machine 100 and through a center of gravity 712 of the machine or an operator positioned within the cab 102 thereof. A rear axle arm axis 714 and a front axle arm axis 716 are also shown in FIG. 7. More specifically, the rear axle arm axis 714 can be perpendicular to, and intersect with, both the rear axle axis 214 and the rear torsion axis 218. Similarly, the front axle arm axis 716 may be perpendicular to, and intersect with both the front axle axis 212 and the front torsion axis 216.

In the embodiment shown in FIG. 7, the underlying surface (not shown) may be substantially parallel to the horizontal axis 710. Further still, in the non-limiting example of FIG. 7, the first and second track assemblies 202, 204 may be positioned along the underlying surface. The rear axle arm axis 714 may intersect the horizontal axis at a first angle $\Theta_1$ and the front axle arm axis 716 may intersect the horizontal axis at a second angle $\Theta_2$.

In one embodiment, the work machine 100 may be in a neutral or unloaded state. In the neutral or unloaded state, the applied force 602 may only be the force required to maintain the position of the frame 104 and cab 102 when it is sitting on the underlying surface and not carrying anything in the implement or bucket 114. In other words, the force 602 shown in FIG. 6 is a resistive force holding up the static weight of the machine. In this neutral or unloaded state, the first angle $\Theta_1$ may be less than the second angle $\Theta_2$.

In another embodiment, the work machine 100 may become disposed in a compressed or loaded state. In the compressed or loaded state, the applied force 602 may be greater than in the neutral state due to a force input from the underlying surface or the bucket 114 may add a load. As the work machine 100 transitions from the neutral state to the compressed state, the front and rear axle arms 702, 704 may rotate at a different rate because of the difference in the front and rear axle arm distances 706, 708 (i.e., the length of each arm is different). For example, the front axle arm 702 may have a first defined length and the rear axle arm may have a second defined length, where the second length is greater than the first length. In one non-limiting example, the second length may be approximately between 1.1-1.5 times the first length. In another non-limiting example, this range may be approximately between 1.2-1.4 times the first length. In a further non-limiting example, the second length may be between 7-8 inches and the first length between 5-7 inches. Moreover, the change in the first angle $\Theta_1$ may be less than the change in the second angle $\Theta_2$ as the work machine transitions from the neutral state to the compressed state.

In the illustrated embodiment of FIG. 7, an instant center 718 may be defined where the rear axle arm axis 714 intersects the front axle arm axis 716. In this embodiment, the instant center 718 may move between at least three positions as shown along an arc-shaped path 720. These three positions of the work machine correspond to a free state, the neutral or unloaded state and the compressed or loaded state. In at least one non-limiting example, the arc-shaped path 720 may have a defined width and height that define the boundaries of the arc-shaped path 720. In at least one embodiment, the maximum width of the arc-shaped path 720 may be smaller than the maximum height 724. Further, the varying change of the first angle $\Theta_1$ compared to the second angle $\Theta_2$ may result in defining the maximum width 722 that is substantially smaller than the maximum height 724.

The relationship between the aforementioned states (i.e., free state, neutral, and compressed states) the kinematic linkage formed by the front and rear axle arms 702, 704, and the resultant pitching motion of an operator positioned within a cab of the machine is shown in FIG. 7. In FIG. 7, the front axle arm 702 and rear axle arm 704 form a four-bar linkage as described above between the machine frame 104 and the track frame 316 (or undercarriage). In a free state, the front and rear axle arms may be disposed in a position where there is no load (i.e., force 602 is approximately zero). The position of the front axle arm 702 and rear axle aim 704 is such that the rear axle arm axis 714 and the front axle arm axis 716 intersect and form an instant center at location 722 of the arc-shaped path 720 of FIG. 7. In the neutral or unloaded state, the force 602 is a resistive force holding up the static weight of the machine 100, as described above. Here, the rear axle arm axis 714 intersects the front axle arm axis 716 and forms an instant center at location 718 of the path 720. In the compressed or loaded position, the implement or bucket 114 may be full of material. The force 602 is a resistive force holding up the machine weight and the weight of the full bucket. In this position, the rear axle arm axis 714 intersects the front axle arm axis 716 and forms an instant center at a different location 724 on the arc-shaped path 720.

The positioning of the axle arms and their respective lengths in each of the different states described above minimizes the amount of pitching in a forward or backward direction experienced by the operator during machine operation. In particular, the instant center 718 travels along the arc-shaped path 720 where the travel may be greater in a vertical direction compared to a horizontal direction to avoid or reduce the pitching motion of the operator in either a forward or backward direction. In one non-limiting example, the pitching about the center of gravity 712 can be defined along an angular path 726 relative to axis 710. The angular path 726 may be less than 2° in one non-limiting example. In another non-limiting example, the pitching may be approximately 1°. In any event, when the machine 100 is travelling in a suspension mode (i.e., with the locking actuator 414 in an unlocked configuration or state), the kinematics of the aforementioned torsion suspension assembly and orientation of the four-bar linkage formed by the front and rear axle arms relative to the machine frame and track frame provides a reduced pitching motion of the operator which can improve the ride quality of the machine.

While front and rear torsion suspension assemblies 206, 210 have been described herein, this disclosure is not limited to any particular location of torsion suspension systems. More specifically, a torsion suspension system may also be positioned along a middle portion. Further still, two torsion suspension systems may be spaced vertically from one another. Any of the torsion suspension systems described herein could utilize the locking coupler arm 404, locking arm 412, and locking actuator 414 described herein. Further still, either the torsion spring 502 or the coil spring can be used in the embodiments described herein.

The previously-described embodiments have been described utilizing a track assembly 202, 204. However, this disclosure also applies to wheeled assemblies or any other driven assembly. More specifically, the axle 402 described herein can be directly mounted to a wheel or other driven assembly in accordance with the teachings of this disclosure. Accordingly, the suspension of this disclosure is not limited to any particular driven assembly.

Another embodiment of the present disclosure is shown in FIG. 8. Here, a control system 800 is disclosed for selectively transitioning the front and/or rear torsion suspension assembly 206, 210 between its suspension or unlocked configuration and the lock configuration. As described herein, the suspension or unlocked configuration allows the torsion suspension assembly of the machine to reduce vibrational inputs felt by the operator during machine operation. In the control system 800 of FIG. 8, the controller 802 may communicate with a first valve 810, the second valve 804 the third valve 806, an accelerometer 816, a vehicle speed sensor 818, a boom arm position sensor 820 and the inputs from the controls 808 through one or more communication channels 814. The communication channels 814 may be an electrical wired or wireless communication and this disclosure is not limited to any specific form of communication channel 814.

Referring now to the hydraulic system 822 shown in FIG. 8, a first actuator 824 and a second actuator 826 may represent the locking actuator 414 along either side of the machine as described above. For purposes of the foregoing description, each actuator 824, 826 may include an outer housing or cylinder and a piston that moves in a substantially linear direction therein based on hydraulic pressure acting on either side of the piston. This is only one example, however, of many types of actuators that may be used in the control system 800 and machine 100. The first and second actuators 824, 826 may each have a first port 830 and a second port 832. The first fluid port 830 may be located at one end of the housing or cylinder and the second fluid port 832 may be located at the opposite end thereof. As such, hydraulic fluid entering the first port 830 may act on one side of the piston, and hydraulic fluid entering the second port 832 may act on the opposite side thereof.

In this embodiment, the first actuator 824 and the second actuator 826 may be coupled to each side of the front torsion suspension assembly 206. However, this disclosure is not limited to only having actuators on the front torsion suspension assembly 206. In another embodiment, a actuator may be positioned on each side of both the front torsion suspension assembly 206 and the rear torsion suspension assembly 210. In yet another embodiment, a actuator may only be positioned at each side of the rear torsion suspension assembly 210. Accordingly, no particular location of the first and/or second actuator 824, 826, or any other actuators, is required.

The controller 802 may selectively manipulate the positioning of each of the valves 810, 806, 804 via electric, pneumatic, hydraulic, or the like to control the positioning of the valve. In one nonexclusive embodiment, each valve 810, 806, 804 may have one or more solenoids that may induce movement of the valves 810, 806, 804 to any position between a closed position, where no hydraulic fluid can pass therethrough, and an open position, where hydraulic fluid can pass therethrough.

The first valve 810 may control the flow of hydraulic fluid into the hydraulic system 822 from a fluid source 828. In one nonexclusive embodiment, when the controller 802 receives a signal to orient the front and/or rear torsion suspension assembly 206, 210 in the lock configuration, the controller 802 may send a signal to close the first valve 810. Once the first valve 810 is closed, each actuator 824, 826 may be substantially locked in the respective position they were in when the first valve 810 was closed. More specifically, when the first valve 810 is closed, hydraulic fluid may not be able to flow into or out of the first and second ports 830, 832, thereby locking the piston (not shown) within the respective actuator 824, 826. The piston (not shown) may then hold the locking arm 412 in the particular radial position the locking arm 412 was in prior to closing the first valve 810. As a result, the front and/or rear torsion suspension assembly 206, 210 may become disposed in the locked configuration.

The second and third valve 804, 806 may also affect the response of the first and second actuator 824, 826. When the first valve 810 is providing hydraulic fluid to the second valve 804, the second valve 804 may selectively route the hydraulic fluid into the first port 830 of the first and/or second actuator 824, 826. Similarly, at substantially the same time the third valve 806 may selectively route the provided hydraulic fluid to the second port 832. In this configuration, the hydraulic fluid provided at both the first and second port 830, 832 may be fluidly coupled through the first, second, and third valves 810, 804, 806.

When the first and second ports 830, 832 are fluidly coupled to one another as described above, the piston can change positions within each respective actuator 824, 826 without substantial resistance. Further still, each of the second and/or third valves 804, 806 may also have an adjustable orifice valve. The adjustable orifice valve may be selectively positionable by the controller 802 to alter or control the allowable flowrate of hydraulic fluid passing therethrough. In the embodiment with the orifice valve, the damping rate of the first and/or second actuator may be controlled by the controller 802 via the one or more orifice valves.

In another embodiment, an accumulator (not shown) may also be fluidly coupled to the hydraulic system 822 between the first port 830 and the second valve 804 and between the second port 332 and the third valve 806. In this embodiment, the third valve 806 may be closed by the controller 802 and the accumulator may provide a springed reaction force to force inputs experienced by the first and/or second actuator 824, 826. Further still, when the third valve 806 is closed, the second valve 804 may selectively provide hydraulic fluid to either one of the first or second actuator 824, 826. As the controller 802 provides additional fluid to one of the actuators 824, 826, that respective actuator 825, 826 may move the piston therein.

In one embodiment, accumulators may control the leveling of the work machine 100. More specifically, if one of the first or second track assemblies 106, 108 sits relatively higher or lower than the other one, the controller 802 may sense such an offset with the accelerometer 816, a tip sensor, and/or any other similar sensor. Once the controller 802 determines that the first track assembly 106 is relatively higher or lower than the second track assembly 108, the controller 802 may control the appropriate actuator 825, 826 as needed until the first track assembly 106 is approximately level with the second track assembly 108.

In another embodiment, the work machine 100 may level the first and second track assembly 106, 108 without having any accumulators. Rather, when the work machine 100 is in the lock position, the controller 802 can utilize the first, second and third valve 810, 804, 806 to position the first and second actuator 824, 826 so they are relatively level with one another.

While opening and closing specific valves 810, 824, 826 has been described in detail above, this disclosure is not limited to only embodiments that utilize the valve configurations described herein. More specifically, the second and/or third valve 804, 806 may be opened or closed by the controller 802 to lock or unlock the first and second actuator 824, 826. Further still, there may be only one valve between the source and the first and second actuator 824, 826 that may be opened and closed to change the lock or unlock condition of the first and second actuator 824, 826. One skilled in the art can appreciate the different locations the valves, accumulators, and actuators may be positioned within the hydraulic system 822 to achieve the locked/unlocked condition of the actuators 824, 826 and this disclosure is not limited to any one configuration.

The controller 802 can further utilize the communication channels 814 to communicate with a plurality of sensors 834 to selectively position the first and/or second actuator 824, 826 as described above. More specifically, one nonexclusive embodiment may include a method for programming the controller 802 to transition the locking actuator 414 between the lock configuration and the suspension or unlocked configuration. As described in more detail above, the controller 802 may send a signal to the first valve 810 to open or close the first valve 810 and thereby transition the actuators 824, 826 between the locked configuration and the suspension or unlocked configuration. In one embodiment, this may be achieved by electrically coupling the controller 802 to a switch in one of the inputs from the controls 808. The input from the controls 808 can selectively command the controller 802 to transition the first valve 810 between the open and close position. The input from the controls 808 may be part of the controls 110 in the cab 102, for example, and provide the operator with an option to selectively lock the first and second actuator 824, 826, damping the suspension, or allow the controller 802 to automatically select whether to lock or unlock the first and second actuators 824, 826.

If the operator input from the controls 808 commands the controller 802 to automatically select to either lock or unlock the first and second actuator 824, 826, the controller 802 may further be programmed to monitor the vehicle speed provided to the controller 802 from a speed sensor 818. In this embodiment, the controller 802 may control the first and second actuators 824, 826 between the locked configuration and the suspension or unlocked configuration based on the monitored speed measured by the vehicle speed sensor 818. In one embodiment, if the work machine 100 is travelling greater than a speed threshold value (e.g., 5 kph), the controller 802 may open the first valve 810 to achieve the suspension or unlocked configuration. However, if the vehicle speed is at or below the speed threshold value, the controller 802 may close the first valve 810 to thereby position the first and second actuators 824, 826 in the locked or rigid configuration.

As described above, the operator may desire the suspension configuration (or mode) because the ride quality of the machine is better with the torsional suspension assembly being active and reducing vibrational inputs felt in the cab. Alternatively, the operator (or controller) may desire the locked or rigid configuration (or mode) for performance reasons when stockpiling, truck loading, grading, etc. The operator, however, can have control over the different configurations or modes and switch therebetween based on his or her manipulation of the controls. Thus, the machine is capable of performing various applications such as stockpiling, truck loading, digging, grading, etc. in either the suspension or rigid configurations or modes.

Returning to the control system 800 of FIG. 8, the controller 802 may also control the first and second actuators 824, 826 between the locked configuration and the suspension or unlocked configuration based on boom arm position or height, which can be provided to the controller 802 from a position sensor 820 or the like. The position sensor 820 may be coupled to the boom arm 112 to communicate to the controller 802 the position of the boom arm 112. In this embodiment, if the boom arm 112 is at or below a position threshold, the controller 802 may transition the first valve 810 to the open position to achieve the suspension or unlocked configuration. Alternatively, when the boom arm 112 is at or above the position threshold, the controller 802 may position the first valve 810 in the close position to achieve the locked or rigid configuration of the first and second actuators 824, 826.

The controller 802 may further control the first and second actuators 824, 826 simultaneously and in conjunction with one another. Alternatively, in another embodiment, the controller 802 may control the first and second actuators 824, 826 independent from one another.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A suspension assembly of a work machine being movable in a forward direction, the work machine including a frame, an undercarriage supporting the frame, at least one boom arm pivotally coupled to the frame, and at least one ground-engaging track, comprising:
   a torsion assembly, the torsion assembly including an axle adapted to be coupled to the undercarriage, a torsion bar adapted to be fixedly coupled to the frame, and an axle arm coupled at one end to the axle and at an opposite end thereof to the torsion bar;
   a locking arm having a first end and a second end, the first end being coupled to the axle arm; and
   a hydraulic actuator coupled to the second end of the locking arm, the hydraulic actuator being operably controlled between a locked configuration and an unlocked configuration;
   wherein:
   in the unlocked configuration, the axle arm is pivotable relative to the frame; and
   in the locked configuration, the axle arm is restricted from pivoting relative to the frame.

2. The suspension assembly of claim 1, wherein in the unlocked configuration, the torsional assembly is structured to absorb vibrational inputs.

3. The suspension assembly of claim 1, further comprising a bogie roller suspension assembly for absorbing vibrational inputs, the bogie roller suspension assembly including at least two pairs of bogie wheels.

4. The suspension assembly of claim 1, wherein the axle arm extends downward from the frame at an angle between 180 and 270 degrees from the forward direction.

5. The suspension assembly of claim 1, further comprising a second torsion assembly disposed near a rear end of the work machine, the second torsion assembly including a second axle coupled to the undercarriage, a second torsion bar fixedly coupled to the frame, and a second axle arm coupled at one end to the second axle and at an opposite end thereof to the second torsion bar.

6. The suspension assembly of claim 5, wherein the first axle arm has a first length and the second axle arm has a second length, where the first length is less than the second length.

7. The suspension assembly of claim 5, wherein:
   the first axle arm extends downward from the frame at an angle between 180 and 270 degrees from the forward direction; and
   the second axle arm extends downward from the frame at an angle between 180 and 270 degrees from the forward direction.

8. The suspension assembly of claim 5, further comprising a first axle and a second axle, the first axle arm being coupled to the first axle about a first axle axis and the second axle arm being coupled to the second axle about a second axle axis;
   wherein, the first axle arm is coupled to the frame and locking arm about a first torsion axis, and the second axle arm is coupled to the frame about a second torsion axis;
   wherein, a first axis passes through a length of the first axle arm and intersects the first axle axis and the first torsion axis, and a second axis passes through a length of the second axle arm and intersects the second axle axis and the second torsion axis;
   further wherein, the first axis and the second axis intersect to define an instant center, the instant center continuously being located at a location in front of the machine.

9. The suspension assembly of claim 8, wherein in the unlocked configuration:
   the instant center is movable along an arc-shaped path based on a free state, an unloaded state, and a loaded state of the first and second axle arms; and
   a center of gravity of the machine is movable along a path defined by a pitch angle, the pitch angle being less than 2 degrees.

10. A work machine being movable in a forward direction of travel, comprising:
   a frame having a front end, a rear end, a first side, and a second side;
   at least one boom arm pivotably coupled to the frame;
   an undercarriage supporting the frame, the undercarriage including at least one ground-engaging track positioned around the undercarriage;
   a first torsion assembly disposed near the front end and adapted to reduce vibrational inputs, the first torsion assembly including a first axle coupled to the undercarriage, a torsion bar fixedly coupled to the frame, and a first axle arm coupled at one end to the first axle and at an opposite end thereof to the torsion bar;
   a second torsion assembly disposed near a rear end of the work machine and adapted to reduce vibrational inputs, the second torsion assembly including a second axle coupled to the undercarriage, a second torsion bar fixedly coupled to the frame, and a second axle arm coupled at one end to the second axle and at an opposite end thereof to the second torsion bar;
   a locking arm having a first end and a second end, the first end being coupled to the first axle arm; and
   a hydraulic actuator coupled to the second end of the locking arm, the hydraulic actuator being operably controlled between a locked configuration and an unlocked configuration;
   wherein:
   in the unlocked configuration, the first axle arm is pivotable relative to the frame; and
   in the locked configuration, the first axle arm is restricted from pivoting relative to the frame.

11. The work machine of claim 10, wherein:
   the first torsion assembly comprises one torsion assembly on the first side of the frame and another torsion assembly on the second side thereof;
   the locking arm comprises a first locking arm and a second locking arm, the first locking arm being coupled to the first axle arm on the first side and the second locking arm being coupled to the first axle arm on the second side; and
   the hydraulic actuator comprises a first hydraulic actuator and a second hydraulic actuator, the first hydraulic actuator being coupled to the first locking arm and the second hydraulic actuator being coupled to the second locking arm.

12. The work machine of claim 10, wherein the first axle arm has a first length and the second axle arm has a second length, where the first length is less than the second length.

13. The work machine of claim 10, wherein:
   the first axle arm extends downward from the frame at an angle between 180 and 270 degrees from the forward direction; and the second axle arm extends downward from the frame at an angle between 180 and 270 degrees from the forward direction.

14. The work machine of claim 10, further comprising a first axle and a second axle, the first axle arm being coupled to the first axle about a first axle axis and the second axle arm being coupled to the second axle about a second axle axis;
wherein, the first axle arm is coupled to the frame and locking arm about a first torsion axis, and the second axle arm is coupled to the frame about a second torsion axis;
wherein, a first axis passes through a length of the first axle arm and intersects the first axle axis and the first torsion axis, and a second axis passes through a length of the second axle arm and intersects the second axle axis and the second torsion axis;
further wherein, the first axis and the second axis intersect to define an instant center, the instant center continuously being located at a point forward of the machine.

15. The work machine of claim 14, further comprising a center of gravity of the machine defined at a location on the machine, wherein in the unlocked configuration the instant center is movable along a curved path and the center of gravity is movable along a path defined by a pitch angle, the pitch angle being less than 2 degrees.

16. The work machine of claim 10, further comprising:
a controller;
a main control valve in fluid communication with the hydraulic actuator;
a solenoid valve fluidly coupled to the main control valve, the solenoid valve including a solenoid disposed in electrical communication with the controller, wherein the solenoid valve is movable between a first position and a second position; and
a damping orifice for damping fluid flow to and from the hydraulic actuator, the orifice being fluidly coupled to the hydraulic actuator and solenoid valve;
wherein, the solenoid is operably controlled between at least a first state and a second state;
further wherein, in the first state, the solenoid valve is movable to a first position to fluidly couple the main control valve and the hydraulic actuator, and in the second state the solenoid valve is movable to a second position to restrict any fluid coupling between the main control valve and the hydraulic actuator.

17. A method of controlling a suspension assembly of a work machine being movable in a forward direction, the machine including a frame, a cab mounted to the frame, operator controls in the cab for operating the machine, an undercarriage, and at least one boom arm pivotally coupled to the frame, the method comprising:
providing a controller, a locking arm, a hydraulic actuator, and a torsion assembly including an axle coupled to the undercarriage, a torsion bar coupled to the frame, and an axle arm coupled at one end to the axle and at an opposite end thereof to the torsion bar such that the axle arm extends downward from the frame at an angle between 180 and 270 degrees from the forward direction;
operating the machine in a first operating mode or a second operating mode, the first operating mode being characteristic of a rigid mode and the second operating mode being characteristic of a suspension mode;
detecting a change between the first operating mode and the second operating mode; and
controlling the hydraulic actuator between a locked configuration and an unlocked configuration based on the detecting state;
wherein in the first operating mode:
controlling the hydraulic actuator to its locked configuration; and
restricting pivotal movement between the axle arm and the frame;
further wherein in the second operating mode:
controlling the hydraulic actuator to its unlocked configuration; and
permitting pivotal movement between the axle arm and the frame.

18. The method of claim 17, wherein the detecting step comprises:
receiving an input from the operator controls; or
sensing a machine characteristic with a sensor, comparing the sensed characteristic to a threshold, and determining the sensed characteristic satisfies the threshold;
wherein, the machine characteristic includes vehicle speed or boom arm height position.

19. The method of claim 17, further comprising continuously maintaining the axle arm at an angle between 180 and 270 degrees from the forward direction in the second operating mode.

20. The method of claim 17, further comprising:
providing a second torsion assembly disposed near a rear end of the work machine, the second torsion assembly including a second axle coupled to the undercarriage, a second torsion bar fixedly coupled to the frame, and a second axle arm coupled at one end to the second axle and at an opposite end thereof to the second torsion bar such that the axle arm extends downward from the frame at an angle between 180 and 270 degrees from the forward direction, where the second axle arm is longer than the first axle arm;
defining a center of gravity at a location on the machine;
maintaining the instant center at a location spaced from a front end of the machine in the forward direction; and
limiting a pitching motion of the center of gravity in the second operating mode to an angle of less than 2°.

* * * * *